Oct. 9, 1945.  L. G. SIMJIAN  2,386,276
PHOTOGRAPHIC APPARATUS
Filed July 25, 1942  4 Sheets-Sheet 1
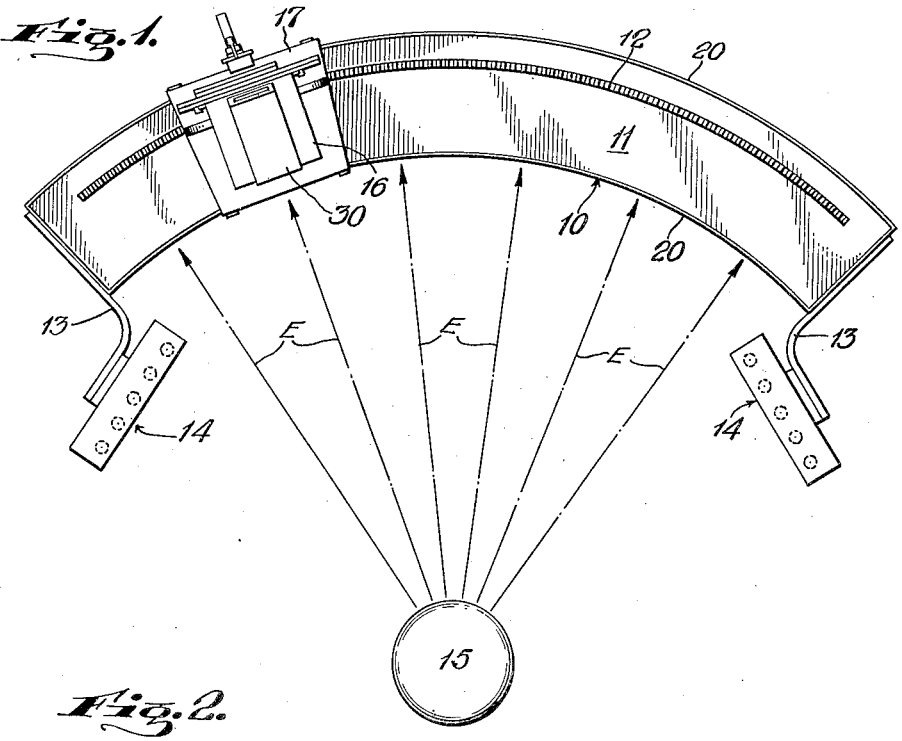
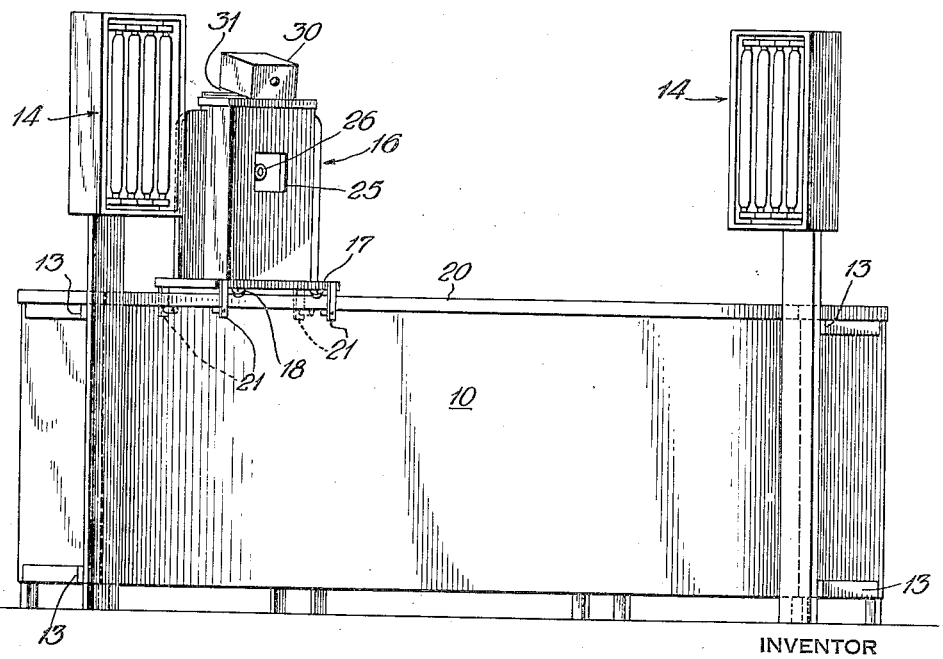
INVENTOR
L. G. Simjian
BY
A. H. Golden
ATTORNEY Oct. 9, 1945.　　　　　L. G. SIMJIAN　　　　　2,386,276
PHOTOGRAPHIC APPARATUS
Filed July 25, 1942　　　　4 Sheets-Sheet 2
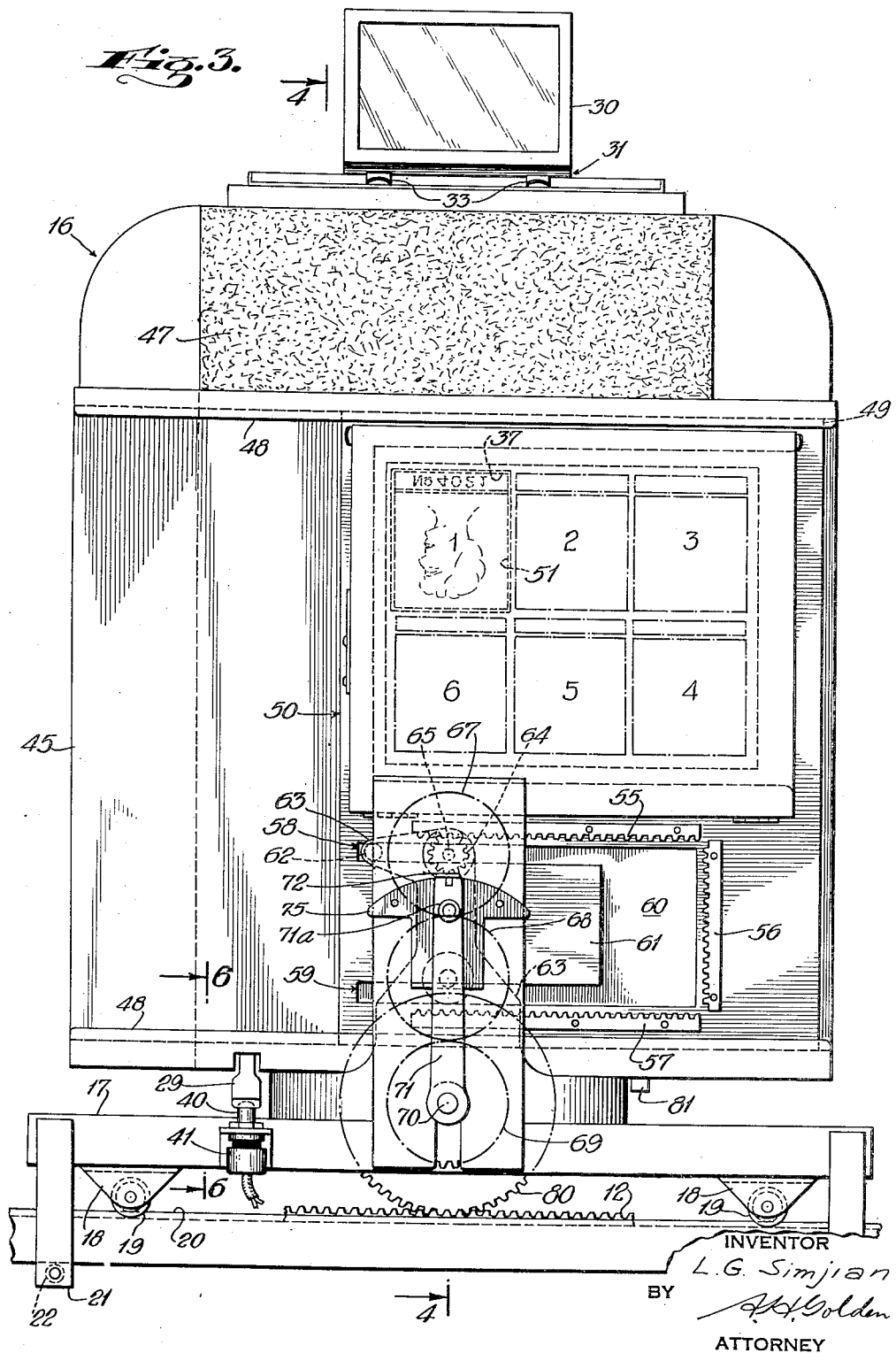
INVENTOR
L. G. Simjian
BY
A. H. Golden
ATTORNEY

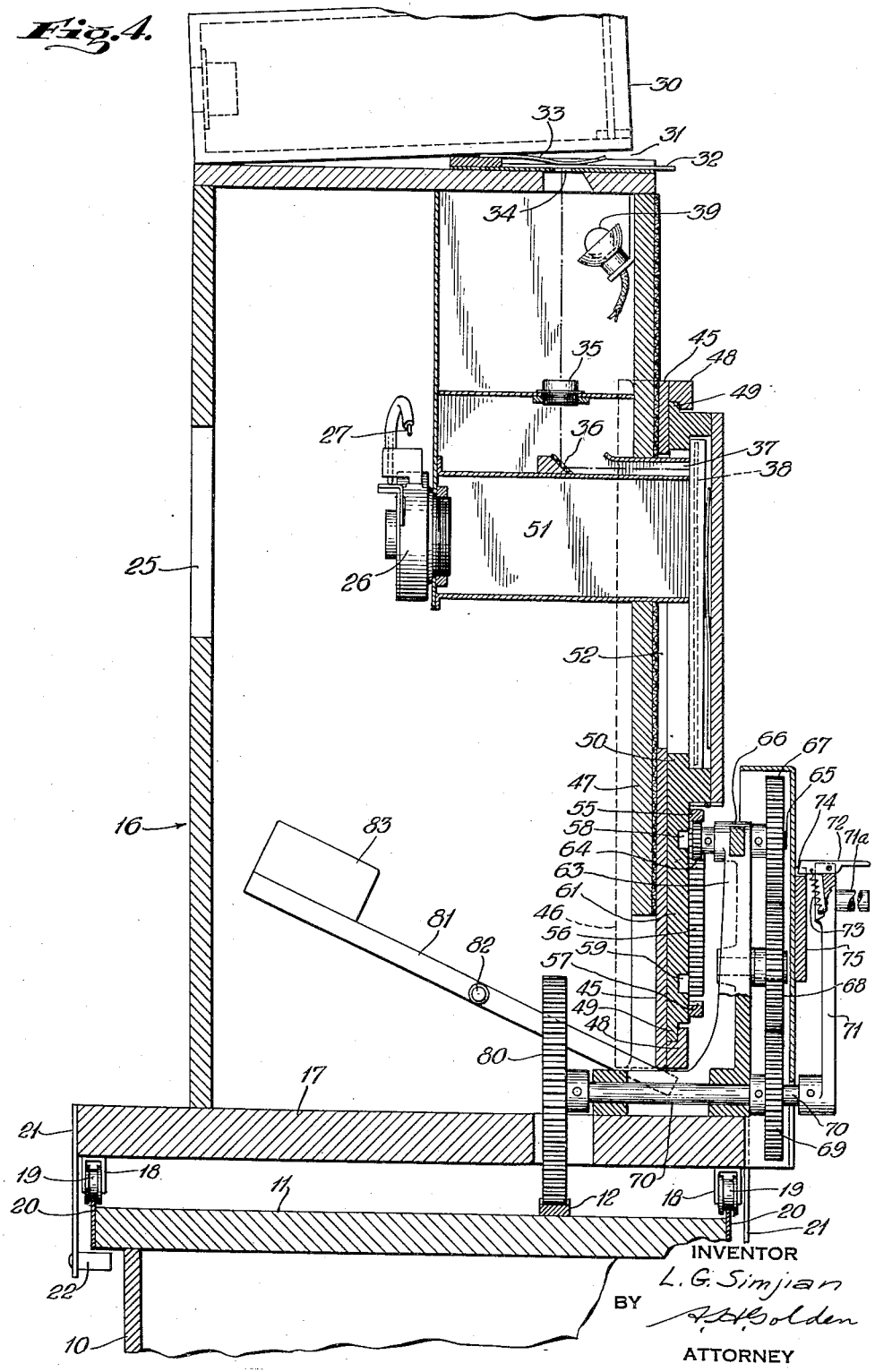

Oct. 9, 1945.  L. G. SIMJIAN  2,386,276
PHOTOGRAPHIC APPARATUS
Filed July 25, 1942  4 Sheets-Sheet 4
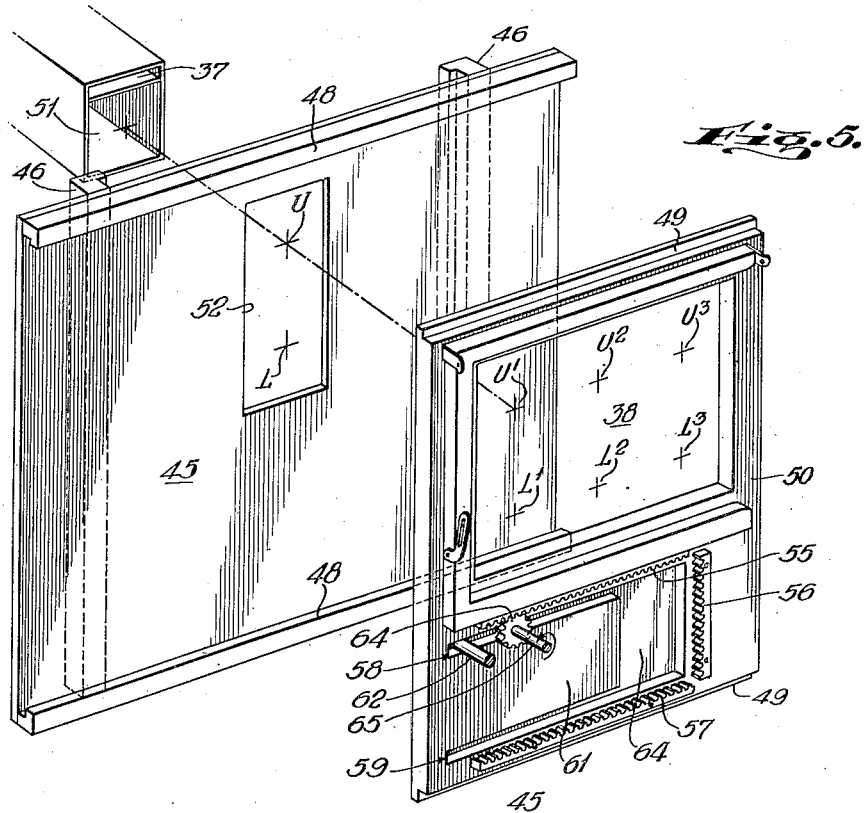
INVENTOR
L. G. Simjian
BY
ATTORNEY Patented Oct. 9, 1945

2,386,276

UNITED STATES PATENT OFFICE 2,386,276

PHOTOGRAPHIC APPARATUS

Luther G. Simjian, Riverside, Conn., assignor to General Research, Inc., Stamford, Conn., a corporation of Connecticut Application July 25, 1942, Serial No. 452,285

17 Claims. (Cl. 95—82)

This invention relates to photographic apparatus of the class adapted to photograph an object from several different positions, and to a camera having a movable element such as a moving photographic plate, whereby it is particularly adapted for use in photographic apparatus of the particular class. More particularly, my invention relates to photographic apparatus of the type disclosed in my Patent No. 2,140,602 issued December 20, 1938.

An important feature of my invention resides in new and novel means for moving an element of the camera of my photographic apparatus, this element being preferably the photographic plate holder of the camera, so that the photographic plate may be moved into several different positions relatively to the lens of the camera. Heretofore, those means that have been developed for moving the plate holder of a camera of the class described have been of rather complex character or have required the operation of a number of elements. In addition, they have not been effective to move the plate holder upwardly and downwardly in a vertical path, and to control at all times the positioning of the plate holder. It is a feature of my invention that a simple operation of a single actuating unit is adapted to move the plate holder in a rather complex path, and preferably in either of opposite directions in said path, while preferably holding the plate holder rigidly in any position in the said path.

More in detail, this feature of my invention embodies the use of a moving device on the camera cooperable with a series of elements on the plate holder arranged in a particular path so that the moving device will move the plate holder in the path formed by the series of elements. Preferably, guide means are utilized to maintain the said moving device and the elements of the plate holder in cooperative relation so that the plate holder will move in the path of the said elements. More particularly, this feature of my invention embodies the use of a rotating pinion on the camera and a series of rack portions arranged, in effect, in a continuous path on the plate holder, with parts of the path at an angle one to the other. The coaction of the pinion with the rack portions is such that the plate holder is moved in a path as determined by the positioning of the rack portions, with the pinion being capable of moving the plate holder in either of opposite directions on said path at all times. It is well to emphasize that mechanical elements other than racks and pinions will occur to those skilled in the art, and that the racks and pinions of my structure form merely a preferred form of mechanical structure.

A further feature of my invention resides in the manner of mounting the camera of the photographic apparatus for movement relatively to a base member, and the means whereby the camera is moved on the base member. As a further feature of this portion of my invention, the means for moving the camera on the base member are actuated by the means that operate the pinion or other means of the camera, whereby to move simultaneously the photographic plate holder of the camera and the camera itself.

A still further feature of my invention resides in the means whereby the camera is automatically stopped in several positions on the base member on which it is mounted for movement, and whereby the plate holder is therefore preferably also stopped in a series of corresponding positions.

A still further feature of my invention resides in the general arrangement of the lighting mechanism cooperating with the camera and the base member on which the camera is mounted, so that a different lighting effect will be obtained in every position of the camera on the base member.

A further feature of my invention resides in the means whereby, in every position of the camera on the base member, a number may be photographed on the photographic plate so that each of the several exposures of the plate may be numbered with facility.

I have thus described generally the more important features of my invention in order that the description of my invention that follows may be better understood. There are certain detailed features of the construction that have not been described generally, but those detailed features will be pointed out in the specification and will be covered in the claims appended thereto. It is important to consider that this invention is a relatively broad one in the particular field to which it is contributed, and that sufficiently broad claims should be granted me to prevent the utilization of the basic concept of my invention by others in readily developed physical forms other than that which I prefer and which I shall disclose herein.

For a description of my invention, I shall refer to the drawings wherein Fig. 1 is a view looking downwardly on the complete assembly of my invention shown with relation to an object to be photographed. Fig. 2 is a vertical view looking toward the structure of Fig. 1 from the object being photographed. Fig. 3 is a view of the camera looking at it from the side opposite that seen in Fig. 2. Fig. 4 is a section taken along lines 4—4 of Fig. 3. Fig. 5 is an exploded view of certain parts of my camera. Fig. 6 is a section along lines 6—6 of Fig. 3.

Referring now more particularly to the drawings and especially Figs. 1 and 2, the base on which my camera is mounted is designated generally by reference numeral 10 and comprises an upper plate 11 formed preferably as a portion of the circumference of a circle. A continuous rack 12 is suitably secured to the plate 11 for cooperation with the camera in a manner to be indicated presently. At each end of the base member 10 there is secured through a suitable standard 13, a bank of fluorescent lighting tubes 14 for lighting the object 15 to be photographed.

The camera of my invention is designated generally by reference numeral 16. It is formed with a base member 17 as best illustrated in Figs. 2, 3 and 4, and at each side of this base member 17 there are fixed brackets 18 for carrying rollers 19 that roll on metal tracks 20 secured in edge binding relation to the plate 11 of the base 10. For assisting in holding the rollers 19 on the tracks 20, the base member 17 has secured thereto a series of brackets 21 terminating in horizontal extensions 22 that fit under the edge of the plate 11, all as is quite apparent from the drawings. It is thus seen that the camera is adapted for movement relatively to the base 10 on the tracks 20 for the purposes to be described presently.

The camera 16 is equipped with a usual opening 25 through which the image will pass to the shutter 26 that is operated by a Bowden wire 27 that extends from the shutter as shown in Fig. 4 toward the bottom of the camera. As shown in Fig. 6, the wire 27 terminates in a headed portion 28 adapted for operation by a lever 29 that extends outwardly of the camera for access to the operator.

Supported above the camera as best seen in Fig. 4, is a range finder 30 of any type well known in the art and between this range finder and the camera there is a suitable space 31 adapted for the insertion of a number plate 32 held in position by springs 33. An opening 34 in the camera allows the image of the number plate 32 to pass downwardly through a lens at 35 and against the mirror 36. The mirror 36 reflects the image through the passage 37 and against the film plate 38. The image of the number plate will be thus reflected against the film 38 whenever the incandescent light bulb 39 is lighted through the closing of its circuit by the depression of the button 40 of a switch 41. This closing of the circuit is accomplished by the depression of lever 29 as is best apparent in Fig. 6.

It is well to indicate that the wiring for the circuit of bulb 39 is so arranged that in any position of the camera on the base 10, the circuit of the bulb 39 may be closed to record on the photographic film 38 the number of numbering plate 32. It is well to note also that this closing of the circuit and the photographing of the number takes place simultaneously with the operation of the shutter 26 by Bowden wire 27 through depression of the lever 29. Thus, the photographing of the object 15 takes place simultaneously with the photographing of the number plate on the plate 38. It will be well now to describe the means whereby the plate 38 is moved relatively to the camera so as to obtain on a single plate a plurality of exposures.

Referring now especially to Figs. 3, 4 and 5, reference numeral 45 indicates a bearing member for the plate 38 equipped with guides 46 whereby it is mounted for vertical sliding movement relatively to the surface member 47 of the camera 16. The bearing member 45 is further equipped with bearing ways 48 in which fit bearing portions 49 of a photographic plate holder 50, so that the plate holder may slide laterally on the bearing member 45. It is therefore seen that the plate holder 50 may slide vertically with the bearing member 45 relatively to the camera, and also laterally relatively to the bearing member 45. It will be noted that the directions given are based on the resting of the camera on the horizontal plane of the plate 11 of the base 10.

The plate holder 50 is of course equipped with the usual means for holding the photographic plate 38 in proper relation thereto for exposure to light passing through the shutter 26, the passage 51, and the opening 52 in bearing member 45. In Fig. 5 it will be noted that in the opening 52 there are upper and lower crosses designated by the letters U and L respectively, it being understood that certain exposures of the film 38 will take place with the bearing member 45 at a level corresponding to the upper cross U while other exposures will take place with the bearing member 45 at a level corresponding to the lower cross L. By glancing at the plate holder 50 in Fig. 5, it will be noted that three upper exposures $U^1$, $U^2$ and $U^3$ will be obtained by the lateral sliding of the plate support 50 at the lower level of bearing member 45, while three lower exposures will be obtained at $L^1$, $L^2$ and $L^3$ by the sliding of the plate support at the upper level of bearing member 45. I shall now describe the particular means whereby the photographic plate holder 50 is moved into the six positions indicated.

Secured to the photographic plate holder 50 are three racks designated by reference numerals 55, 56 and 57, it being noted that the racks 55 and 57 are horizontal, while the rack 56 is vertically positioned. Parallel horizontal grooves 58 and 59 are formed in the plate holder 50, and these terminate in a depression 60 so as to define with the grooves what is in effect a guide cam 61. Cooperating with the periphery of the guide cam 61 is a pin 62 (Fig. 6) extending toward the plate holder 50 from a bracket 63 that is suitably secured to the base portion 17 of the camera. The function of pin 62 and cam 61 will be emphasized later.

For cooperation with the teeth of the several racks, I utilize a pinion 64 mounted on the end of a shaft 65 that is supported in a bearing 66 at the upper end of the bracket 63, and is rotated by a gear 67 pinned to the shaft 65 and driven by an idler gear 68. Idler gear 68 is in turn driven by a gear 69 pinned to a shaft 70 that is pinned to a crank 71. It is obvious that rotation of the pinion 64 by the crank 71 through the several means indicated, will effect a lateral sliding of the plate holder 50 whenever the pinion 64 is in engagement with the racks 55 and 57, and will effect a vertical movement of the plate holder 50 together with the bearing member 45 when the pinion is in contact with the vertical rack 56. The arrangement of the racks is such that they form a continuous path in effect, it being obvious that when the pinion 64 is at the upper end of the vertical rack 56, it is adapted to engage the first tooth of the horizontal rack 55 and when it is at the lower end of rack 56 the pinion 64 engages the end of rack 57. Note should be made that the pinion 64 is adapted to drive the racks in either of opposite directions from one end of the path of said racks to the other, and at all times holds the racks and plate holder in a desired position.

It will now be quite apparent that rotation of the crank 71 through its handle 71a will be effective to position the plate holder 50 for the six exposures I prefer to obtain, and that arrangements may be made to obtain as many other exposures as may be desired. It will also be obvious that by rearranging the several racks and by adding additional ones, the path of the plate holder 50 may be changed quite readily. The pin 62 cooperating with guide cam 61 is exceedingly important in that the two elements are adapted to maintain the pinion and the racks in engagement at all times. Therefore, in effect, the pin 62 and cam 61 form a guide means for the guidance of the plate holder 50, with the racks and pinion serving merely as traction means to move the plate holder 50.

For automatically stopping the plate holder 50 at each of the six points of exposure, I have so arranged my camera that one complete rotation of the crank 71 effects the movement of the plate holder from any one point of exposure to the next point of exposure. A detent 72 pivoted on crank 71 is actuated by spring 73 so as to fall automatically within a notch 74 of a plate 75 whenever the crank moves to its vertical position of Figs. 4 and 6, that being the position at which the plate holder 50 will be located at one of the points of exposure designated by the several letters U¹, U², U³ and L¹, L² and L³. For thereafter moving the plate holder to the next point of exposure it is merely necessary to release the detent 72 from the notch 74 and rotate the crank one revolution, all as will be readily perceived.

Certain of the means for moving the plate holder 50 through the crank 71 are also utilized to move the entire camera 16 relatively to the base member 10. This is accomplished by pinning to the shaft 70 a gear 80 that is adapted to engage the rack 12 formed on the base plate 11. The gear 80 is so calibrated that one revolution of the crank 71 will move the camera from one point of exposure to another point on the base 10. The six points of exposure are designated by the six arrows E in Fig. 1. Those skilled in the art will now appreciate of course, that each time the film holder 50 is locked to the camera at one of its points of exposure by the detent 72, the camera will itself be locked at one of the points on the base 10 at which the exposure is to be made. As has already been indicated clearly, the exposure is made by operating the lever 29, and that simultaneously with the making of the exposure the lamp 39 is rendered incandescent so that the number of the number plate 32 may be photographed on the film.

For facilitating the vertical movement of the plate holder 50 and its bearing member 45 I arrange a counterbalancing lever 81 pivoted at 82 to the camera and weighted at 83. The lever 82 presses at the under side of the bearing member 45 and counterbalances the weight of the said bearing member and the plate holder 50.

I believe that the operation and structure of my invention will now be readily understood by those skilled in the art.

I now claim:

1. In a camera of the class described, a plate holder for carrying a flat plate-like film for exposure through a lens of said camera, means mounting said plate holder for movement in a plane parallel to the plane of said plate-like film, a series of rack portions fixed to said plate holder substantially end to end and in predetermined angular relation to form in effect a continuous angular path, and a pinion rotatably mounted on said camera for engagement with said rack portions to move said film holder in said plane parallel to said film plate as predetermined by the angular positioning of said rack portions.

2. In a camera of the class described, a plate holder for carrying a flat plate-like film for exposure through a lens of said camera, means mounting said plate holder for movement in a plane parallel to the plane of said plate-like film, rack portions fixed to said plate holder in predetermined angular relation, a pinion adapted for successive contact with said rack portions for moving said plate holder, and means for maintaining said pinion and rack portions in engagement whereby said plate holder moves in a path in said plane parallel to said film plate as predetermined by the angular positioning of said rack portions.

3. In a camera of the class described, a plate holder for carrying a flat plate-like film for exposure through a lens of said camera, means mounting said plate holder for movement in a plane parallel to the plane of said plate-like film, a series of rack portions fixed to said plate holder substantially end to end in predetermined angular relation to form in effect a continuous angular path, a pinion rotatably mounted on said camera for engagement successively with said rack portions to move said film holder, and means for maintaining said pinion and rack portions in engagement whereby said plate holder moves in said plane parallel to said film plate as predetermined by the angular positioning of said rack portions.

4. In a camera of the class described, a plate holder for carrying a flat plate-like film for exposure through a lens of said camera, means mounting said plate holder for movement in a plane parallel to the plane of said plate-like film, a series of traction contributing means fixed to said plate holder to form a continuous path in effect of said traction contributing means and with portions of said path angularly disposed relatively to one another, a movable traction contributing device mounted for movement on said camera and engageable successively with the series of traction contributing means for moving said plate holder, and means for maintaining at least one of said traction contributing means and said device always in engagement whereby said plate holder moves in a path determined by the shape of the continuous path of said traction contributing means.

5. In a camera of the class described, a plate holder for carrying a flat plate-like film for exposure through a lens of said camera, means mounting said plate holder for movement in a plane parallel to the plane of said plate-like film, rack portions fixed to said plate holder and forming, in effect, a continuous rack having a pair of parallel portions connected by a transverse portion perpendicular to the said parallel portions, a pinion rotatable on said camera and cooperable with said rack portions to move said plate holder, and guide means for holding said rack portions and pinion in engagement so that said plate holder is moved by said rack portions and pinion in said plane parallel to said film plate in a path predetermined by the shape of the path formed by said rack portions.

6. In a camera of the class described, a plate holder for carrying a flat plate-like film for exposure through a lens of said camera, means mounting said plate holder for movement in a plane parallel to the plane of said plate-like film, rack portions fixed to said plate holder and forming, in effect, a continuous rack having a pair of parallel portions connected by a transverse portion perpendicular to the said parallel portions, a pinion rotatable on said camera and cooperable with said rack portions to move said plate holder in said plane parallel to said film plate in a path predetermined by the shape of the path formed by said rack portions.

7. In a camera of the class described, a plate holder for carrying a flat plate-like film for exposure through a lens of said camera, means mounting said plate holder for movement in a plane parallel to the plane of said plate-like film, rack portions fixed to said plate holder in predetermined angular relation, a pinion adapted for successive contact with said rack portions for moving said plate holder in said plane parallel to said film plate in a path as predetermined by the angular positioning of said rack portions, means for rotating said pinion, and detent means for locking said pinion rotating means against rotation after predetermined limited movement of said plate holder.

8. In a combination of the class described, a camera, a plate holder for carrying a flat plate-like film for exposure through a lens of said camera, means mounting said plate holder for movement in a plane parallel to the plane of said plate-like film, a series of rack portions fixed to said plate holder substantially end to end in predetermined angular relation to form in effect a continuous angular path in a plane parallel to the plane of said film, a pinion rotatably mounted on said camera for engagement with said rack portions to move said plate holder as predetermined by the angular positioning of said rack portions, a base member, means mounting said camera for movement on said base member, movable traction means on said camera, stationary traction contributing means on said base member cooperable with said movable traction means on said camera whereby to move said camera along said base member, and means for rotating said pinion and said movable traction means to obtain simultaneous movement of said plate holder relatively to said camera and of said camera relatively to said base member.

9. In a combination of the class described, a base member, a camera, means mounting said camera for movement on said base member, movable traction means on said camera, means on said camera for moving said traction means relatively to said camera, stationary traction contributing means on said base member cooperable with said movable traction means on said camera whereby to move said camera along said base member, a film support on said camera, means mounting said film support for vertical and horizontal sliding movement relatively to said camera, and means whereby said means that move said traction means also moves said film support horizontally and vertically on said mounting means relatively to said camera.

10. In a combination of the class described, a base member, a camera, means mounting said camera for movement on said base member into different displaced positions thereon, movable traction means on said camera, means on said camera for moving said traction means relatively to said camera, a film support on said camera, means mounting said film support for vertical and horizontal sliding movement relatively to said camera, and means whereby said means that move said traction means also moves said film support vertically and horizontally relatively to said camera.

11. In a combination of the class described, a camera, a plate holder for carrying a flat plate-like film for exposure through a lens of said camera, means mounting said plate holder for movement in a plane parallel to the plane of said plate-like film, a series of rack portions fixed to said plate holder substantially end to end in predetermined angular relation to form in effect a continuous angular path in a plane parallel to the plane of said film, a pinion rotatably mounted on said camera for engagement with said rack portions to move said film holder as predetermined by the angular positioning of said rack portions, a base member, means mounting said camera for movement on said base member, traction means for moving said camera along said base member, and means for rotating said pinion and for moving said traction means to obtain simultaneous movement of said plate holder relatively to said camera and of said camera relatively to said base member, and means for stopping said camera at several predetermined points on said base member.

12. In a combination of the class described, a base member, a battery of lamps secured at each end of said base member, a camera, means mounting said camera for movement along said base member into different displaced positions thereon, a plate holder in said camera, means mounting said plate holder for movement vertically and laterally relatively to said camera, means mounted on said camera for moving said plate holder and camera simultaneously whereby simultaneously to position said camera relatively to said base and lamps, and said plate holder relatively to said camera.

13. In a camera of the class described, a plate holder for carrying a flat plate-like film for exposure through a lens of said camera, means mounting said plate holder for vertical movement and for horizontal movement on said camera in a plane parallel to the plane of said film, a series of rack portions fixed to said plate holder substantially end to end in predetermined angular relation to form in effect a continuous angular path in said plane parallel to said film, a pinion rotatably mounted on said camera for engagement successively with said rack portions to move said film holder on said mounting means, and means for maintaining said pinion and rack portions in engagement whereby said plate holder moves as predetermined by the angular positioning of said rack portions.

14. In a camera of the class described, a plate holder for carrying a flat plate-like film for exposure through a lens of said camera, means mounting said plate holder for vertical movement and for horizontal movement on said camera in a plane parallel to the plane of said film, a series of traction contributing means fixed to said plate holder to form a continuous path in effect of said traction contributing means and with portions of said path angularly disposed relatively to one another in said plane parallel to said film, a movable traction contributing device mounted for movement on said camera and engageable successively with the series of traction contributing means for moving said plate holder on said mounting means, and means for maintaining at least one of said traction contributing means and said device always in engagement whereby said plate holder moves in a path determined by the shape of the continuous path of said traction contributing means.

15. In a camera of the class described, a plate holder for carrying a flat plate-like film for exposure through a lens of said camera, means mounting said plate holder for vertical movement and for horizontal movement on said camera in a plane parallel to the plane of said film, rack portions fixed to said plate holder and forming, in effect, a continuous rack having a pair of parallel portions connected by a transverse portion perpendicular to the said parallel portions, a pinion rotatable on said camera and cooperable with said rack portions to move said plate holder on said mounting means in said plane parallel to said film, and guide means for holding said rack portions and pinion in engagement so that said plate holder is moved by said rack portions and pinion in a path predetermined by the shape of the path formed by said rack portions.

16. In a camera of the class described, a plate holder for carrying a flat plate-like film for exposure through a lens of said camera, means mounting said plate holder for vertical movement and for horizontal movement on said camera in a plane parallel to the plane of said film, rack portions fixed to said plate holder and forming, in effect, a continuous rack having a pair of parallel portions connected by a transverse portion perpendicular to the said parallel portions, a pinion rotatable on said camera and cooperable with said rack portions to move said plate holder on said mounting means in said plane parallel to said film and in a path predetermined by the shape of the path formed by said rack portions.

17. In a combination of the class described, a camera, a plate holder for carrying a flat plate-like film for exposure through a lens of said camera, a series of rack portions secured to said plate holder in predetermined angular relation to form in effect a continuous angular path in a plane parallel to the plane of said film, a pinion rotatably mounted on said camera for engagement with said rack portions to move said plate holder as predetermined by the angular positioning of said rack portions, a base member, means mounting said camera for movement along said base member, means for moving said camera on said base member, and means for simultaneously rotating said pinion and for actuating said means for moving said camera whereby to obtain simultaneous movement of said plate holder relatively to said camera and of said camera relatively to said base member.

LUTHER G. SIMJIAN.